United States Patent
Huignard et al.

[11] Patent Number: 6,069,728
[45] Date of Patent: May 30, 2000

[54] DISPLAY DEVICE AND FLAT TELEVISION SCREEN USING THIS DEVICE

[75] Inventors: Jean-Pierre Huignard, Paris; Brigitte Loiseaux, Bures Sur Yvette; Cécile Joubert, Paris; Anne Delboulbe, Bagneux, all of France

[73] Assignee: Thomson-CSF, Paris, France

[21] Appl. No.: 09/091,845

[22] PCT Filed: Nov. 5, 1997

[86] PCT No.: PCT/FR97/01980

§ 371 Date: Jul. 2, 1998

§ 102(e) Date: Jul. 2, 1998

[87] PCT Pub. No.: WO98/20390

PCT Pub. Date: May 14, 1998

[30] Foreign Application Priority Data

Nov. 5, 1996 [FR] France ................................. 96/13454

[51] Int. Cl.⁷ ............................... G02F 1/03; G02F 1/07
[52] U.S. Cl. ..................... 359/245; 359/252; 359/254; 359/619
[58] Field of Search ................................. 359/245, 252, 359/253, 254, 267, 272, 619, 630

[56] References Cited

U.S. PATENT DOCUMENTS

| | | |
|---|---|---|
| 4,451,412 | 5/1984 | Loiseaux et al. . |
| 4,576,434 | 3/1986 | Huignard et al. . |
| 4,847,521 | 7/1989 | Huignard et al. . |
| 5,181,054 | 1/1993 | Nicolas et al. . |
| 5,206,674 | 4/1993 | Puech et al. . |
| 5,258,969 | 11/1993 | Refregier et al. . |
| 5,272,496 | 12/1993 | Nicolas et al. . |
| 5,323,372 | 6/1994 | Puech et al. . |
| 5,410,421 | 4/1995 | Huignard et al. . |
| 5,416,617 | 5/1995 | Loiseaux et al. . |
| 5,467,206 | 11/1995 | Loiseaux et al. . |
| 5,526,063 | 6/1996 | Joubert et al. . |
| 5,546,200 | 8/1996 | Nicolas et al. . |
| 5,621,547 | 4/1997 | Loiseaux et al. . |
| 5,652,672 | 7/1997 | Huignard et al. . |
| 5,680,386 | 10/1997 | Le Carvennec et al. . |
| 5,734,447 | 3/1998 | Loiseaux et al. . |
| 5,784,181 | 11/1991 | Loiseaux et al. . |
| 5,801,794 | 6/1995 | Lehureau et al. . |
| 5,940,050 | 1/1997 | Joubert et al. . |
| 5,946,114 | 6/1994 | Loiseaux et al. . |
| 5,994,687 | 9/1997 | Chanteloup et al. . |
| 6,014,192 | 7/1997 | Lehureau et al. . |

*Primary Examiner*—Georgia Epps
*Assistant Examiner*—Evelyn A. Lester
*Attorney, Agent, or Firm*—Oblon, Spivak, McClelland, Maier & Neustadt, P.C.

[57] ABSTRACT

A display device including an illuminating source which emits radiation and a spatial light modulator illuminated by the radiation. The modulator includes a matrix of N×M elementary pixels ($X_{i,j}$) of dimensions $d_N \times d_M$, the pixels $X_{i,j}$ and $X_{1+i,j}$ being separated by a spacing $p_N$. The radiation is collimated in each pixel. The spacing $p_N$ is greater by at least an order of magnitude than the dimension $d_M$. The display may be used as a flat television screen.

21 Claims, 10 Drawing Sheets

DISPLAY DEVICE AND FLAT TELEVISION SCREEN USING THIS DEVICE

BACKGROUND OF THE INVENTION

1. Field of the Invention

The field of the invention is that of display devices and in particular that of flat television screens of large dimension, consisting of an active liquid crystal matrix with matrix addressing (LCD).

2. Discussion of the Background

Currently, the construction of flat television screens of large dimensions (thickness less than 5 cm and surface area greater than 1 m$^2$) constitutes a priority objective in the presentation of high-definition TV colour images. The applications of these screens are extremely varied and cover both the professional sector and the general-public sector.

Hitherto, television images of large dimensions have been produced by projecting the image onto a screen, from a small-size liquid crystal matrix (diagonal less than 5 cm). Several companies are now constructing and marketing front-projection or retroprojection systems. However, these systems are of limited performance in view of the following parameters:

the bulkiness of the overall structure: projection plus screen;

the low optical efficiency of a projection system;

insufficient luminance of the projected image when the latter is of large dimension.

Under these conditions, it would be particularly beneficial to work towards a truly flat screen with active liquid crystal matrix, of large size and viewed directly with no projection device.

Nevertheless, the extension of current technologies in large-size active liquid crystal matrices is essentially limited by the dimension of the elementary pixels of the said active matrices, necessary in the construction of the flat screen.

Thus, when pixel sizes of the order of a mm$^2$ are envisaged, such an area of the liquid crystal electrooptical element leads to a considerable capacitance of the pixel. This considerable capacitance hampers the operation of the large-size screen at the video rate. Currently, all of the points of a line (around 800 points) can be addressed in 60 $\mu$s, this being made possible by virtue of the small size of the pixels (100 $\mu$m×100 $\mu$m). Such addressing becomes difficult when the size of the elementary pixels is increased beyond this dimension.

SUMMARY OF THE INVENTION

In order to solve this problem, the present invention proposes a display device and in particular a flat television screen, comprising a matrix of large dimension with a pixel size which is small compared with the spacing of the white image points.

By using a compact illuminating device compatible with collimated illumination which exploits the maximum light flux, it becomes possible to obtain a direct view (with no bulky projection optics) flat display screen of large dimensions which can be addressed at the video rate on account of small dimensions of the elementary pixels.

More precisely, the subject of the invention is a display device comprising an illuminating source emitting radiation Ip, and a spatial light modulator illuminated by the radiation Ip, the said modulator consisting of a matrix of N×M elementary pixels ($X_{i,j}$) of dimensions $d_N \times d_M$, the pixels $X_{i,j}$ and $X_{i+1,j}$ being separated by a spacing $p_N$, the pixels $X_{i,j}$ and $X_{i,j+1}$ being separated by a spacing $p_M$, characterized in that the device comprises means for collimating the radiation Ip in each pixel and in that the spacing $p_N$ is greater by at least an order of magnitude than the dimension $d_N$.

According to a preferred variant of the invention the spacing $p_M$ is greater by at least an order of magnitude than the dimension $d_M$.

The subject of the invention is also a colour display device comprising a display device comprising a light source simultaneously emitting several radiations in chromatic component ranges (R, G, B) and a spatial light modulator comprising a matrix of N×M elementary dots ($D_{i,j}$), each dot including at least one elementary sub-pixel per chromatic component range ($X_{Ri,j}$; $X_{Gi,j}$; $X_{Bi,j}$) of dimensions $d_N \times d_M$, the sub-pixels $X_{Ri,j}$ ($X_{Gi,j}$; $X_{Bi,j}$) being separated from the sub-pixels $X_{R(i+1),j}$ ($X_{G(i+1),j}$; $X_{B(i+1),j}$) by a spacing pN, the pixels $X_{Ri,j}$ ($X_{Gi,j}$; $X_{Bi,j}$) being separated from the pixels $X_{Ri,j+1}$ ($X_{Gi,j+1}$; $X_{Bi,j+1}$) by a spacing $p_M$, characterized in that the spacing $p_N$ is greater by at least an order of magnitude than the dimension $d_N$.

Preferably, the illuminating source is focused by an array of lenses in each elementary pixel, the pupil being of the order of magnitude of the parameter $p_N \times p_M$.

For efficient collimation of the light flux in the small pixels of the large matrix, the invention proposes to use illuminating sources which are more compact than the conventional illuminating sources which use in particular parabolic reflectors and standard collimators.

For this reason, the subject of the invention is also a display device comprising an illuminating source which comprises a light source and a light waveguide coupled to the said light source, the light waveguide comprising a diffracting element situated along the guide, in order to diffract emergent light rays from the source, in a direction substantially perpendicular to the surface of the waveguide, the said surface of the waveguide being substantially parallel to the plane of the spatial light modulator.

According to another variant of the invention, the display device comprises a spatial modulator of light in a plane (yox), a source of light and means of collimating of the said source so as to create a collimated beam in a plane (zox), a first anamorphic mirror M$_1$ whose surface makes an angle $\theta_1$ with the plane (zoy) so as to spread the collimated beam in a plane (yox) and a second mirror M$_2$ making an angle $\theta_2$ with the plane (yox) so as to return the collimated beam towards the spatial light modulator. The anamorphic function may be achieved by an index grating or a relief grating, or else by a set of splitter plates.

To produce a colour image, the spatial modulator can include R, G, B filters situated on the sub-pixels $X_{Ri,j}$, $X_{Gi,j}$, $X_{Bi,j}$.

According to another variant, the spatial modulator comprises an illuminating source comprising spatio-chromatic means.

For example, the spatial modulator has no filters and advantageously the illuminating source can comprise a member which can be a diffractive mirror capable of angularly dispersing the R, G, B components of incident radiation in the case of a spatial modulator comprising elementary sub-pixels $X_{Ri,j}$, $X_{Gi,j}$, $X_{Bi,j}$, or else a set of dielectric mirrors arranged fan-like so as to angularly separate the R, G, B components.

The subject of the invention is also a process for constructing a display device according to the invention, comprising the manufacture of a spatial light modulator consisting of a matrix of N×M elementary pixels on a substrate using several steps of masking with the aid of suitable masks so as to define the N×M elementary pixels, the control electrodes and the switching circuits of the spatial modulator, this process being characterized in that:

it comprises the employing of an array $R_1$ of lenses on the rear face of the substrate intended for the construction of the spatial modulator;

the various masks are imaged directly through the array $R_1$ of lenses so as to produce, on the front face of the substrate, the elementary pixels, the electrodes and the control circuits.

BRIEF DESCRIPTION OF THE DRAWINGS

The invention will be better understood and other advantages will emerge on reading the following description given by way of non-limiting example and by virtue of the appended figures in which.

DISCUSSION OF THE PREFERRED EMBODIMENTS

The display device according to the invention comprises a spatial light modulator of the liquid crystal active matrix type. The invention lies in the use of pixels of small dimensions relative to the total area of the set of elementary image points.

Figure 1:
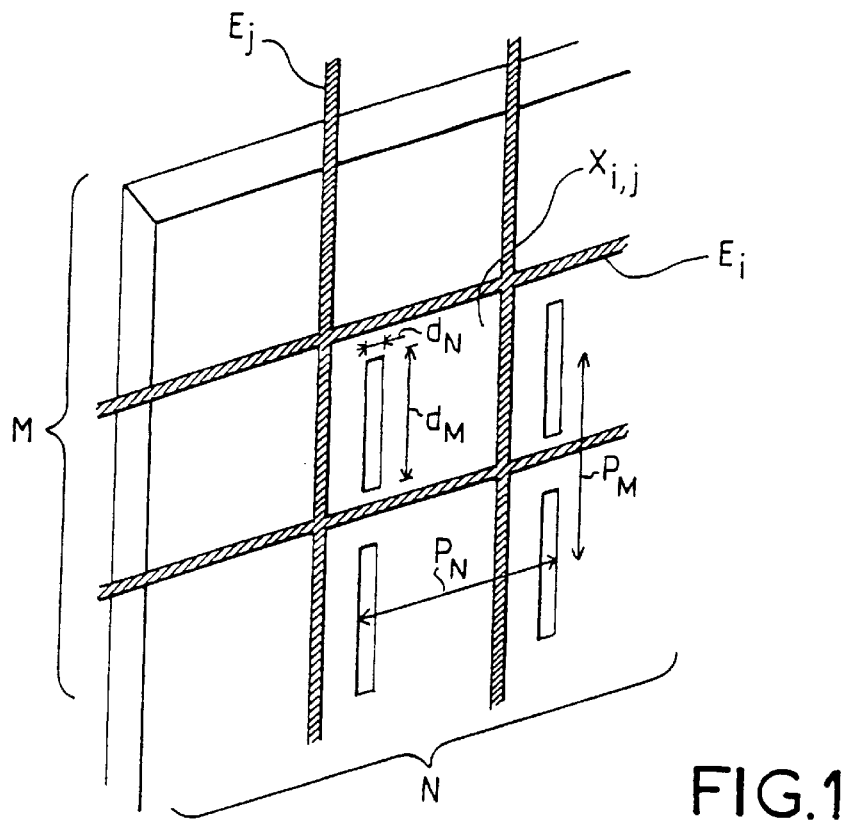
FIG. 1 illustrates a first active matrix configuration used in a display device according to the invention.

FIG. 1 illustrates a first possible configuration of an active matrix comprising matrix addressing obtained via an array of electrodes $E_i$, $E_j$ capable of electrically controlling N×M elementary pixels, $X_{i,j}$ of liquid crystal type electrooptical material via transistors (not represented). These may advantageously be thin-film transistors constructed using amorphous Si or polycrystalline Si technology. In this configuration the entire area of elementary pixels remains small compared with the size of the matrix. Thus, the dimension $d_N$ is less by at least an order of magnitude than the spacing $p_N$, it being possible for the dimension $d_M$ to be of the order of magnitude of the spacing $p_M$.

Figure 2:
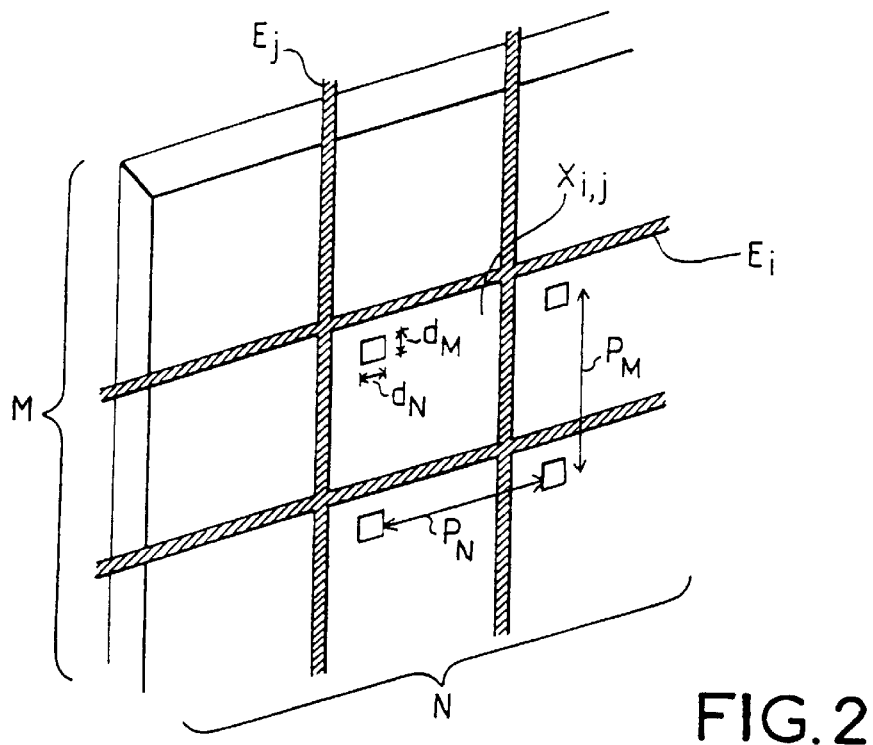
FIG. 2 illustrates a second active matrix configuration used in a display device according to the invention.

FIG. 2 illustrates an active matrix similar to that of FIG. 1, in which the size of the elementary pixels is further reduced since in this configuration the parameters $d_N$ and $d_M$ are of the same order of magnitude.

To illuminate an active matrix used in the invention, it is sought to focus an incident radiation in each elementary pixel $X_{i,j}$. To do this use is made of a source of light, collimating means and means for focusing the light in the various pixels $X_{i,j}$.

Figure 3:
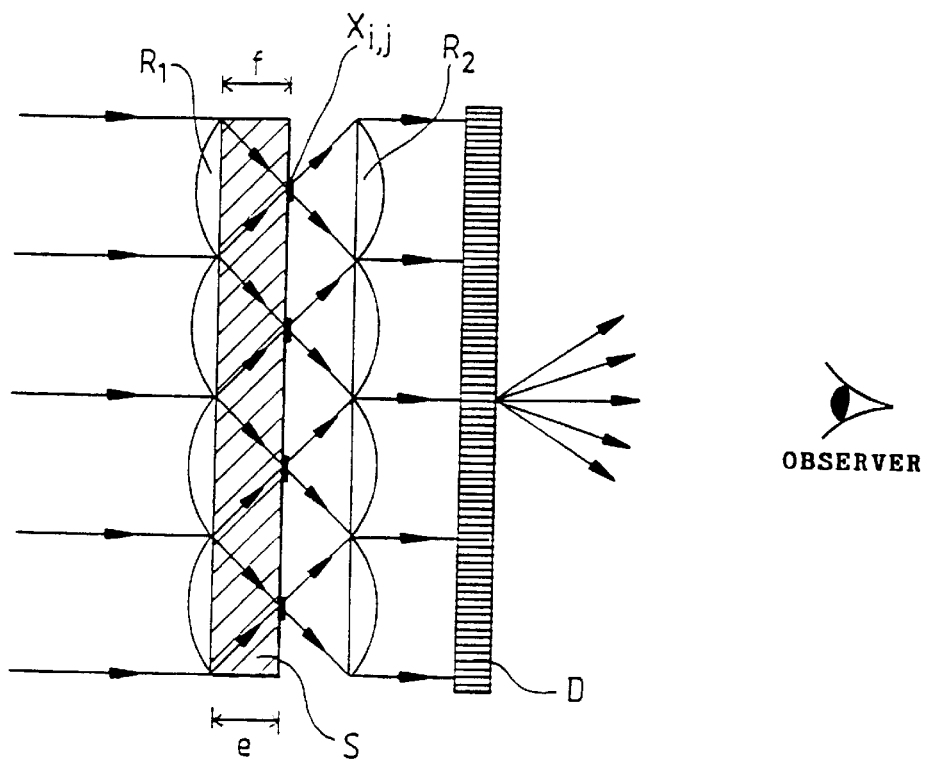
FIG. 3 illustrates an example of a display device according to the invention comprising an incident beam of collimated light, two arrays of lenses and a diffuser.

FIG. 3 illustrates a display device according to the invention, comprising an array $R_1$ of N×M lenses enabling a collimated incident radiation Ip to be focused onto each elementary pixel $X_{i,j}$. With the active matrix having a thickness e of substrate S, an array of lenses can be attached to or constructed (by moulding in particular) on the rear face of the said matrix (the opposite side from the pixel), in which the ratio t=f/n where n is the index of the medium (air or substrate of the active matrix) would be greater than or equal to the thickness e so as to yield a very compact lens array $R_1$/active matrix assembly.

When the active matrix which is to be addressed is that of FIG. 1, the array $R_1$ can comprise N cylindrical lenses.

When the active matrix is of the type represented in FIG. 2, the array $R_1$ can comprise N×M spherical lenses, the spacing of the array being of the order of the parameter $p_N$ (or $p_M$, $p_M$ being similar in value to $p_N$).

At the output of the active matrix, the display device can, in the conventional manner, comprise a second array $R_2$ of lenses, identical to the array $R_1$ and generating a beam whose intensity has been modulated by each liquid crystal pixel $X_{i,j}$ as a function of the electrical signals applied to the electrodes $E_i$ and $E_j$. This beam collimated towards an observer can be scattered by a diffuser D, in such a way as to adapt the radiation diagram of the display device.

The device of the invention comprises means for collimating an incident beam in order to illuminate the array $R_1$ of lenses, upstream of the liquid crystal matrix.

The problem of addressing at video rate having been solved, to construct a display screen which is as flat as possible despite the large dimensions of the active matrix, several solutions relating to the illumination may be adopted.

There are several means, some of them known, for gradually extracting the incident beam emanating from the source, and for generating an illumination collimated in one direction.

Guide collimator with external prism

A fairly conventional solution consists in coupling the light source 11 to a light guide 13 with the aid of a collimator 12. The rays from the source propagate by total internal reflection within the guide. Since the two faces of the guide are not parallel, the angle a which they form is calculated so as gradually to pull the propagating light rays back towards the normal to the guide so as to extract them therefrom in order to provide homogeneous illumination. A refracting element needs to be placed on the guide so as to redirect the light extracted from the guide in a direction almost perpendicular to the surface of the guide. A set of prisms of index np makes it possible to reflect in the direction perpendicular to the guide of index ng the rays extracted from the latter, which emerge from it in-an oblique direction (the angles at the base of these prisms being almost equal to 45° and np>ng>1) (see FIG. 4).

Under these conditions, the light extracted from the guide is collimated in a plane zox. It can therefore be focused in the direction z with the aid of a cylindrical lens matrix (cylinder axis // y).

Collimator with built-in diffracting element

Figure 5:
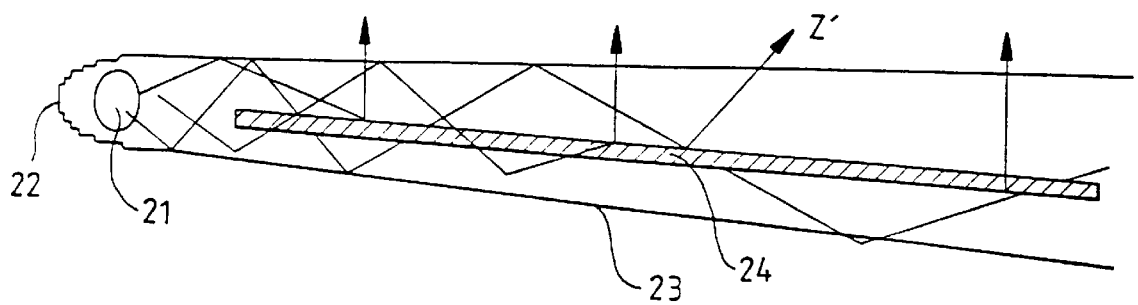
FIG. 5 illustrates a second example of an illuminating source which can in particular be used to illuminate an active matrix of the type represented in FIG. 2.

The diffracting element lying along the guide may advantageously be a holographic element consisting of a layer of material comprising an index grating organized into strata. The strata are oriented at around 45° with respect to the axis of the light waveguide. FIG. 5 illustrates such a compact collimated source. The light source 21 is coupled to a light guide by a collimator 22. The diffracting element 24 is placed in the core of the guide 23 and diffracts emergent rays in a direction perpendicular to the plane of the guide, represented by the plane zoy, if the guide is a plane guide in the yox plane. This collimated illumination source is arranged parallel to the active matrix and to the plane array $R_1$ of cylindrical lenses.

On entering the guide the light occupies all the angles of incidence which can propagate within an index medium (limit angle). The diffracting element may advantageously be a holographic element obtained by interference of two coherent beams in the plane of a photosensitive layer. In order to diffract emergent rays in a plane zoy, the holographic element can be made by producing an index grating exhibiting index strata oriented in a plane z'oy making an angle of 45° with the plane zoy. The photosensitive layer can typically be dichromated gelatin or a photopolymer.

The waveguide coupled to the light source can advantageously have a dihedral structure so as to bring emergent rays into the cone of capture of the hologram corresponding to the set of angles of incidence for which the hologram is diffracting in the z'oy plane.

Figure 4:
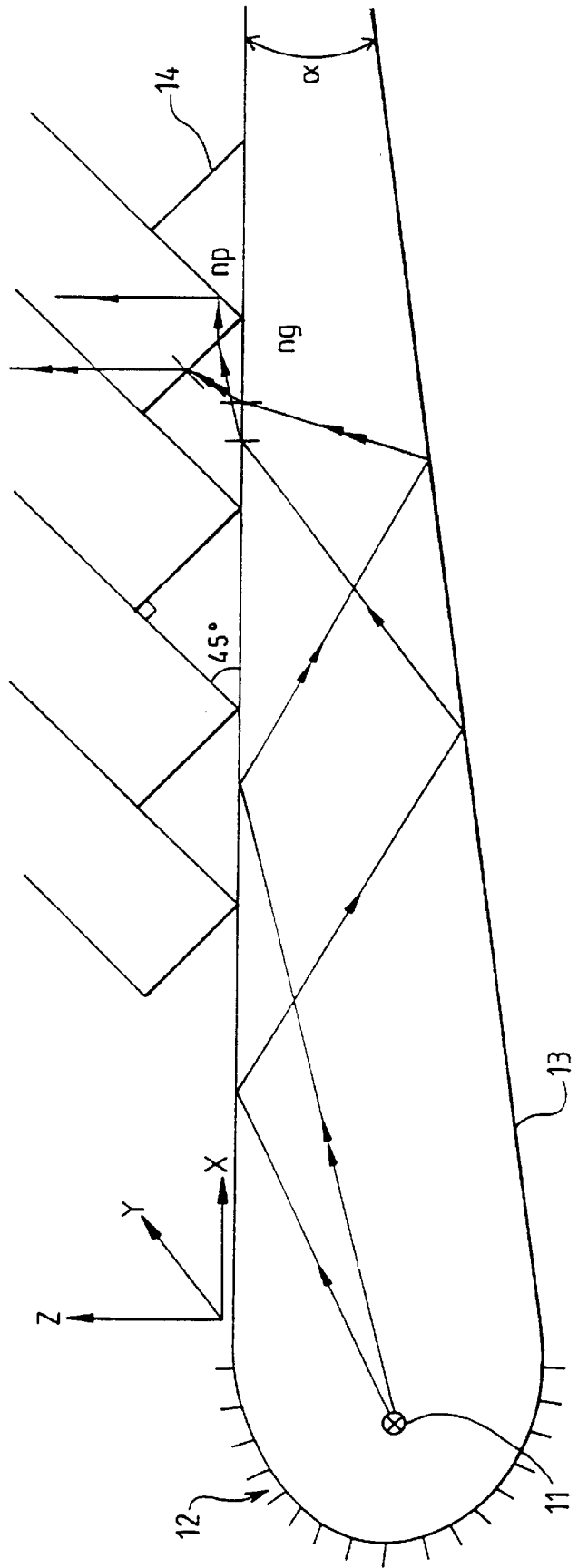
FIG. 4 illustrates a first example of an illuminating source which can in particular be used to illuminate an active matrix of the type represented in FIG. 1.

This type of configuration of illuminating source makes it possible efficiently to collimate the light flux in the zoy plane onto the elementary pixels $X_{i,j}$, after focusing by the array $R_1$ the small dimension $d_N$ along the x axis represented in FIG. 4.

Figure 6:
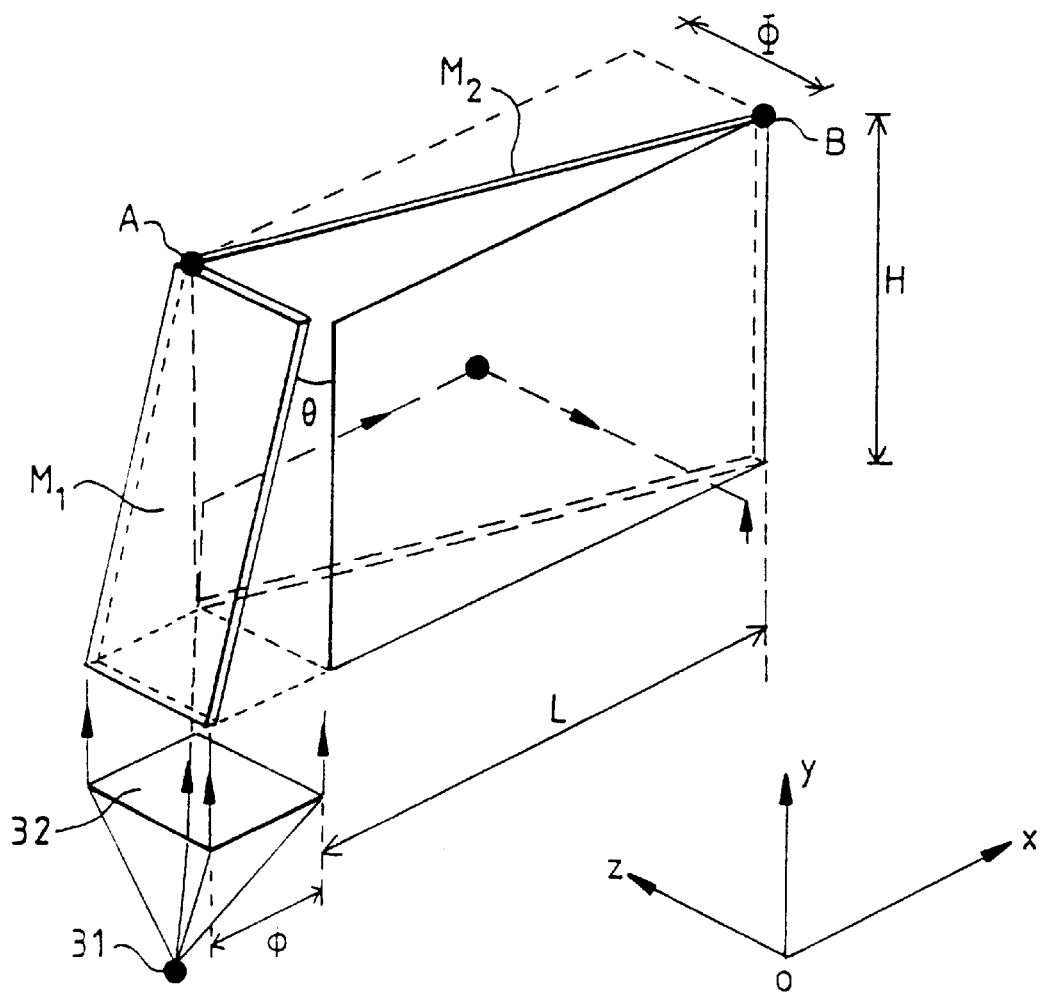
FIG. 6 illustrates a third example of an illuminating source which can be used to illuminate an active matrix of the type represented in FIG. 2.

To illuminate an active matrix of the type represented in FIG. 2, the display device can comprise another illuminating source which delivers a light flux collimated in the zoy plane and also collimated in the zox plane. FIG. 6 illustrates this illuminating source comprising a light source 31, a collimating lens 32, an anamorphic mirror $M_1$ and a second mirror $M_2$. The collimated light flux emanating from the source 31 is reflected by the mirror $M_1$ and is returned in the yox plane parallel to the plane of the active matrix. To carry out this function, the plane of the mirror $M_1$ makes an angle θ with the zoy plane so as to intercept the set of collimated light rays. In order to return this set of rays to the desired plane, the mirror $M_1$ has a particular relief or index grating type structure with strata oriented at 45° to the ox axis.

Figure 7:
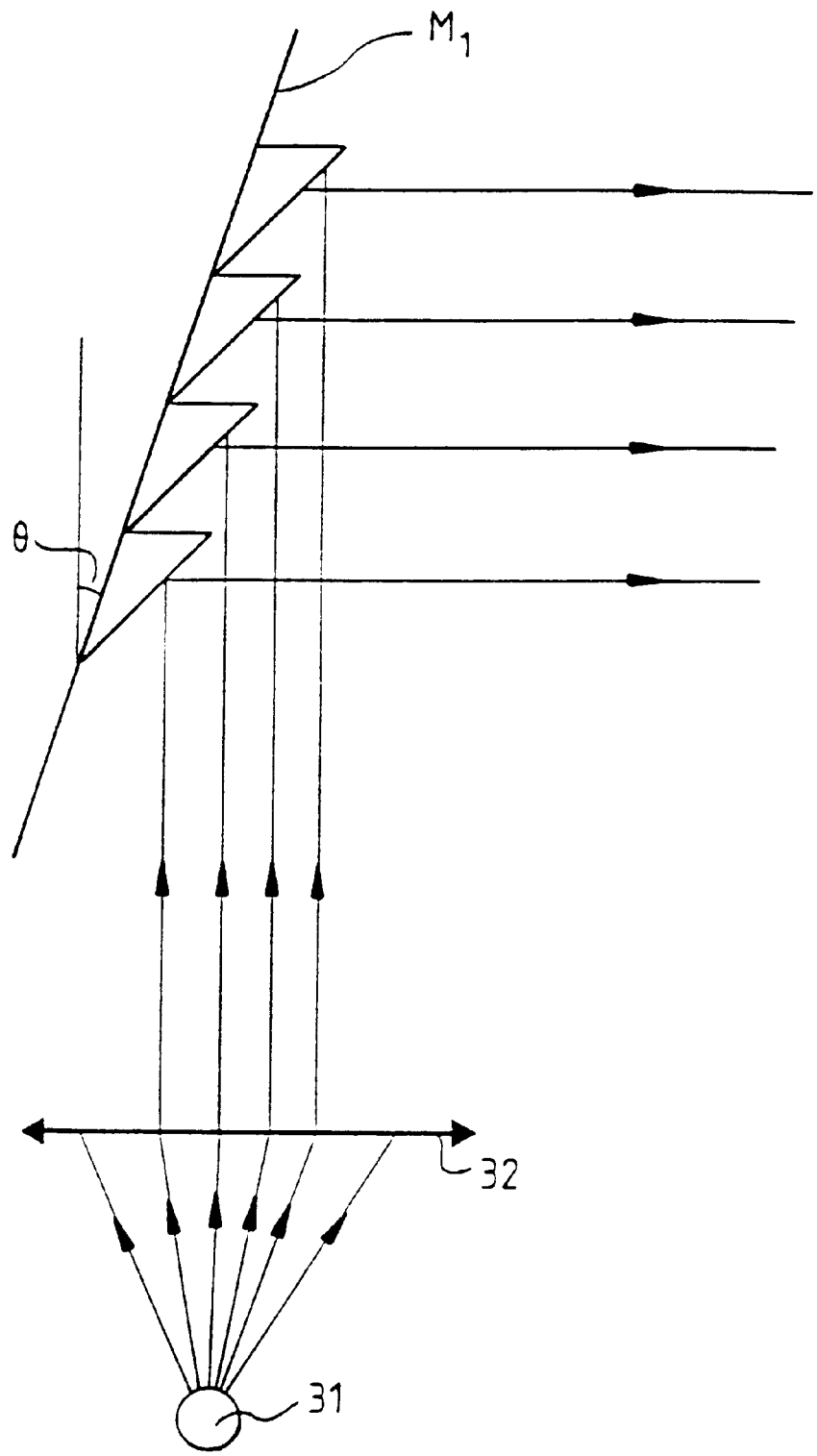
FIG. 7 illustrates a first example of an anamorphic mirror $M_1$ used in the illuminating source schematized in FIG. 5.

FIG. 7 diagrammatically illustrates an example of a mirror $M_1$ which may also be of holographic type with a grating function having high efficiency of diffraction, recorded for example in a photopolymer material. After replaying using a plane wave, in this instance the incident beam emanating from the source, the grating thus produced makes it possible to spread the collimated beam over the height H of the active matrix with H=φcotg θ

φ being the diameter of the collimating lens 21.

A second mirror $M_2$ collimates the light flux spread over the entire surface of the active matrix. This mirror has a structure similar to that of the mirror $M_1$ and is placed in a plane making an angle $φ_1$, with the yox plane as indicated in FIG. 6.

Other configuration for producing compact collimated illumination

Figure 8:
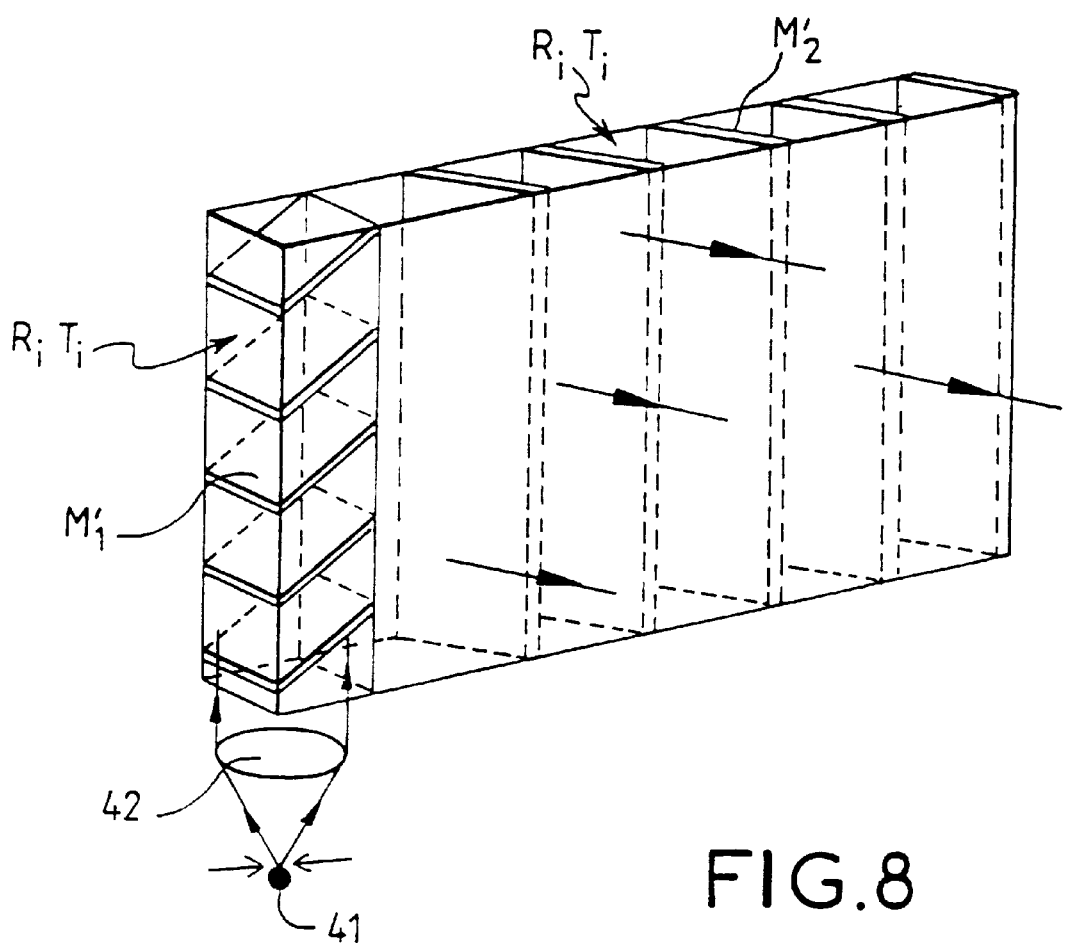
FIG. 8 illustrates a second example of an anamorphic mirror $M'_1$.

The anamorphic mirror $M_1$ mentioned above can be replaced by an optical member $M'_1$ consisting of N 45° splitting plates. The coefficient of reflection/transmission $R_iT_i$ of these plates can be adjusted so that the luminous intensity is distributed uniformly over the array of microlenses and hence over the electrooptical pixels after focusing. Furthermore, it is noted that the position of this element is not critical having regard to the distance between pixels which may typically be of the order of 300 μm to 1 μm. Two members of this type $M'_1$ and $M'_2$ serve to produce collimated compact illumination from a short-arc lamp. The means for producing these members are of the moulding/pressing technique type (see FIG. 8).

Figure 9:
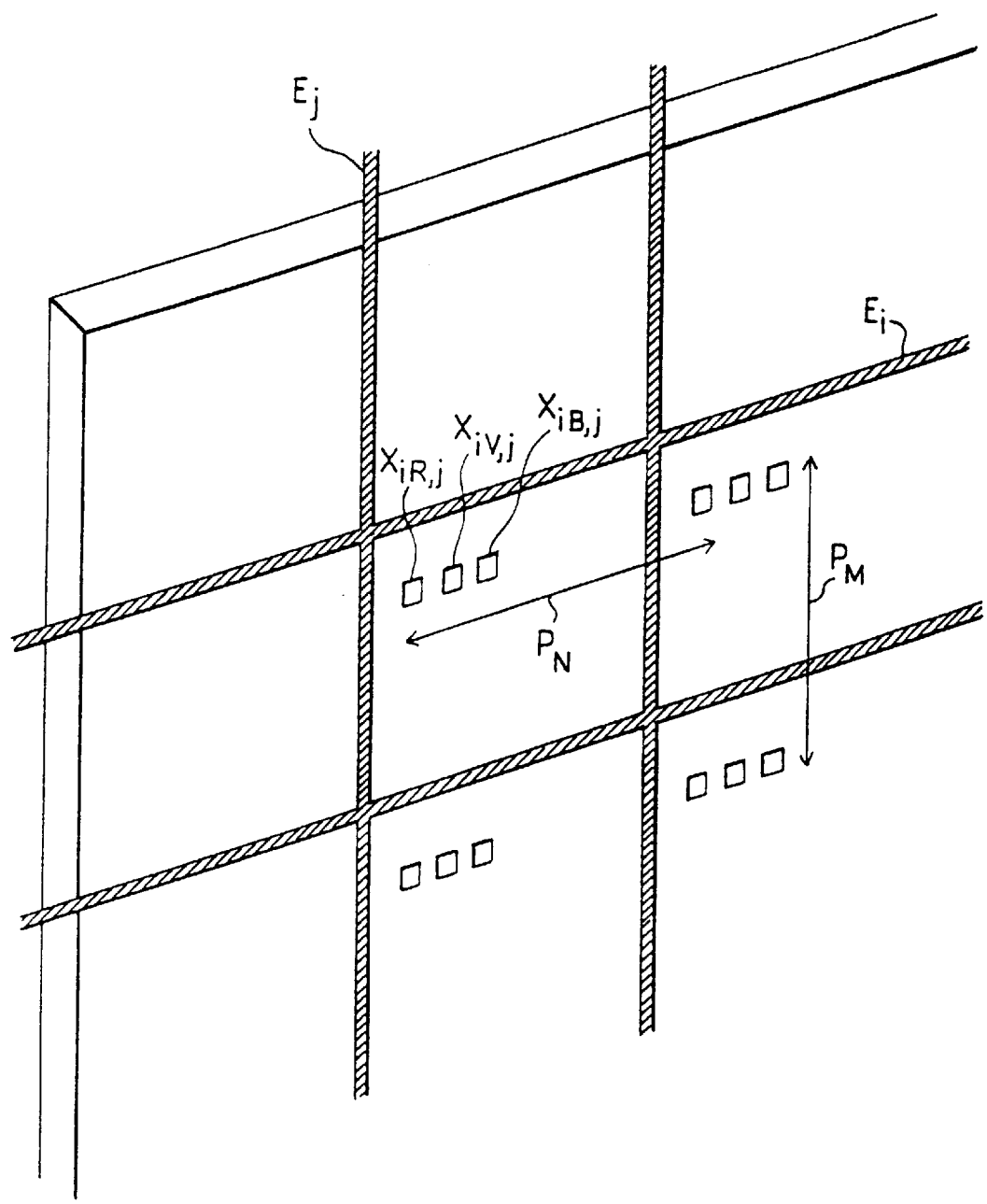
FIG. 9 illustrates a third active matrix configuration used in a trichrome display device according to the invention.
Figure 10A:
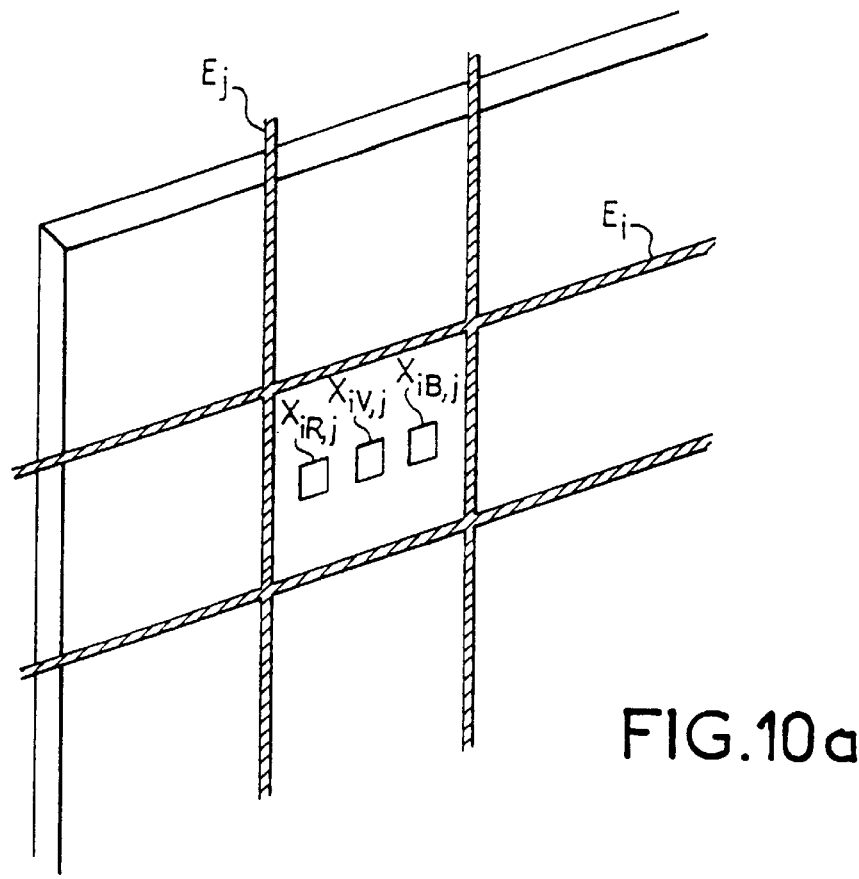
FIGS. 10a and 10b illustrate other active matrix configurations used in a trichrome display device.
Figure 10B:
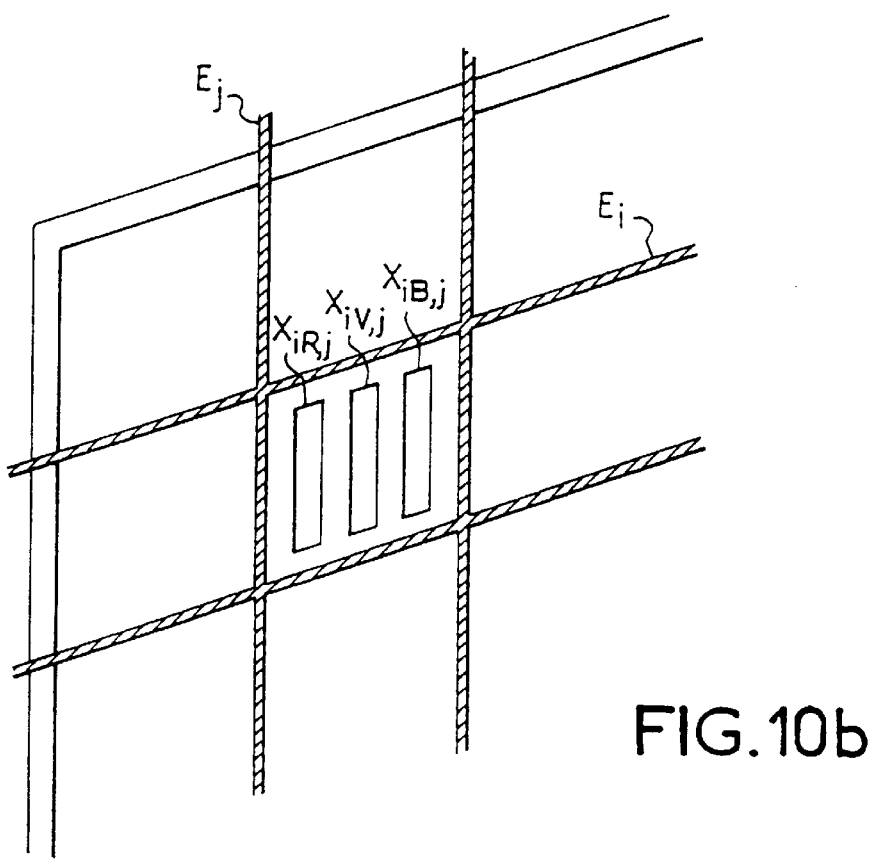

The abovedescribed illuminating sources are especially beneficial in the case of a colour display screen and allow illumination almost perpendicular to the plane of the screen. In these applications the active matrix exhibits a dot consisting of sub-pixels $X_{iR,j}$, $X_{iG,j}$ and $X_{iR,j}$ as illustrated in FIG. 9. It should be noted that the invention is compatible with a pixel distribution such as that proposed in FIGS. 10a and 10b. The active matrix then consists of pixels of square shape (50×50 μm typically), or of rectangular shape (50 μm×300 μm) with a spatial period in the horizontal direction of the order of 300 μm. In the vertical direction the spatial period of these elementary pixels is equal to 1 mm. A "white" pixel then consists of three equidistant elementary pixels R.G.B. whose spacing is 300 μm.

The case of a colour image with colour filters

To produce a colour image, the various aforementioned illuminating systems can be associated, by means of the device of the invention, with a spatial modulator which comprises RGB filters situated on the sub-pixels XG, B, R. Under these conditions, the production of an efficient illuminating system requires the use of a matrix of cylindrical or spherical lenses depending on the geometry of the pixels in order to focus the illumination in the transparent region of the pixels. The spacing of this lens matrix will either be equal to the period of the white pixels when the sub-pixels are grouped according to an organization of the grouped sub-pixel type, or equal to the period of the sub-pixels when the latter are equidistributed within the white sub-pixel.

The case of illumination of the spatio-chromatic type

The microlens array and the means of chromatic dispersion by diffractive grating and/or by three-colour separator of the dielectric mirror type are suitable for generating RGB spectral components selectively focused within the pixels of the LCD screen.

The collimated light emanating from the compact illuminating system is selectively focused in the electrooptical pixels with the help of the microlens array.

A first type of three-colour separator can consist of a set of dielectric mirrors arranged fan-like so as angularly to separate the RGB components. This separator is placed at the output of the light source and upstream of a collimating assembly of the type with aforementioned members $M_1$ and/or $M_2$.

According to another variant, the member $M_1$ or $M_2$ has a chromatic separation function.

Figure 11:
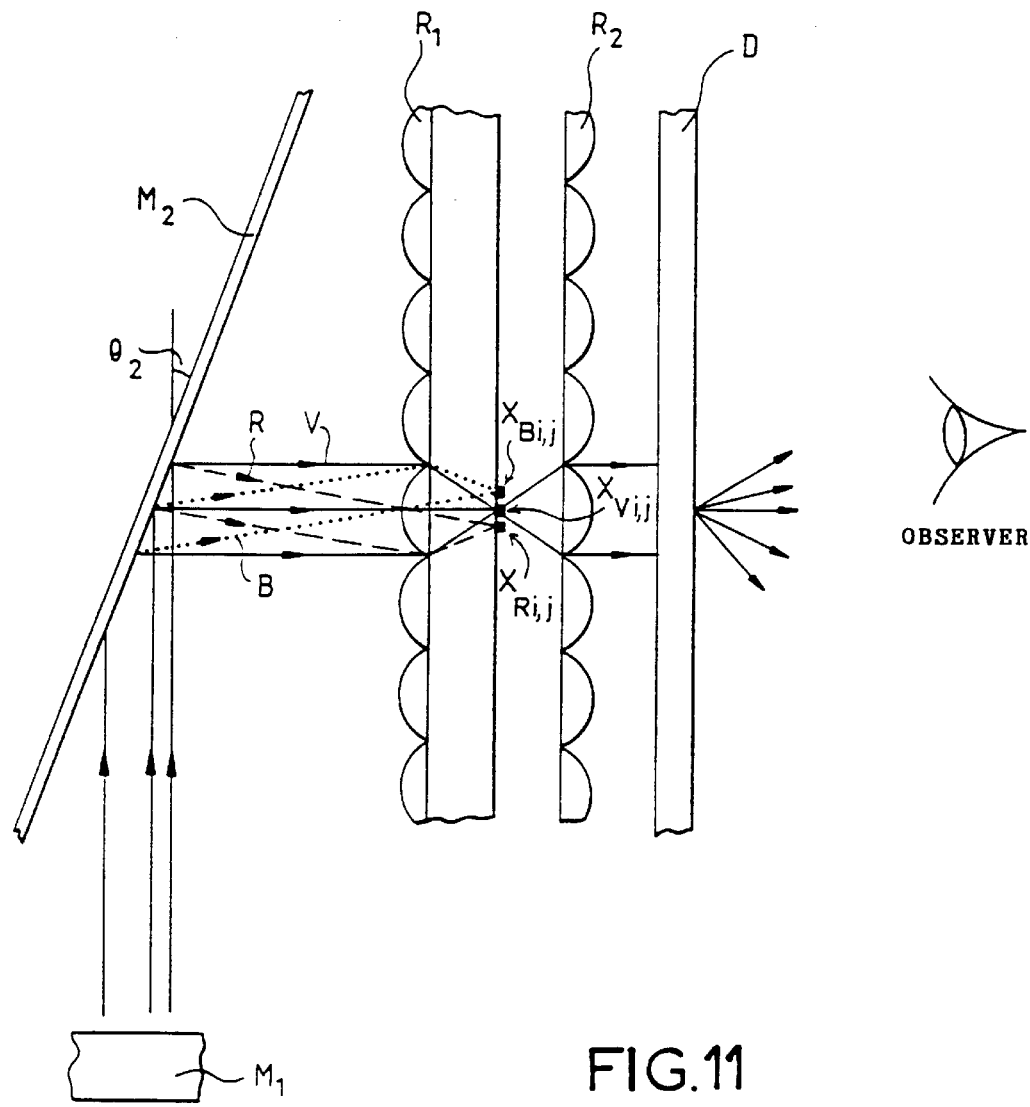
FIG. 11 illustrates a trichrome display device.

For example, it is possible to use a light source 20 comprising the red, green, blue spectral components, the collimated light flux then spread is diffracted on the mirror $M_2$ which can exhibit a diffracting structure such that it also performs the chromatic separation function as illustrated in FIG. 11. To do this, the mirror $M_2$ can advantageously be of dispersive holographic type, the angular dispersion being obtained by inclining the strata within the volume of the photosensitive material or by superimposing three independent layers diffracting at angles $\theta_R$, $\theta_G=0$ and $\theta_B$ with respect to the normal to the plane of the screen. Thus the red, green, blue light beams can illuminate the array $R_1$ of lenses which focus the beams in the elementary sub-pixels $X_{Ri,j}$, $X_{Gi,j}$ and $X_{Bi,j}$ respectively; the said beams subsequently being collimated by the second array of lenses $R_2$ towards the diffuser D. The second array of lenses of focal length f/2 generates the image of a "white" pixel in a plane symmetric with the liquid crystal screen with respect to the second array of microlenses. The diffuser D or a Fresnel type screen which directs the light towards the observer is placed in this plane.

Figure 12:
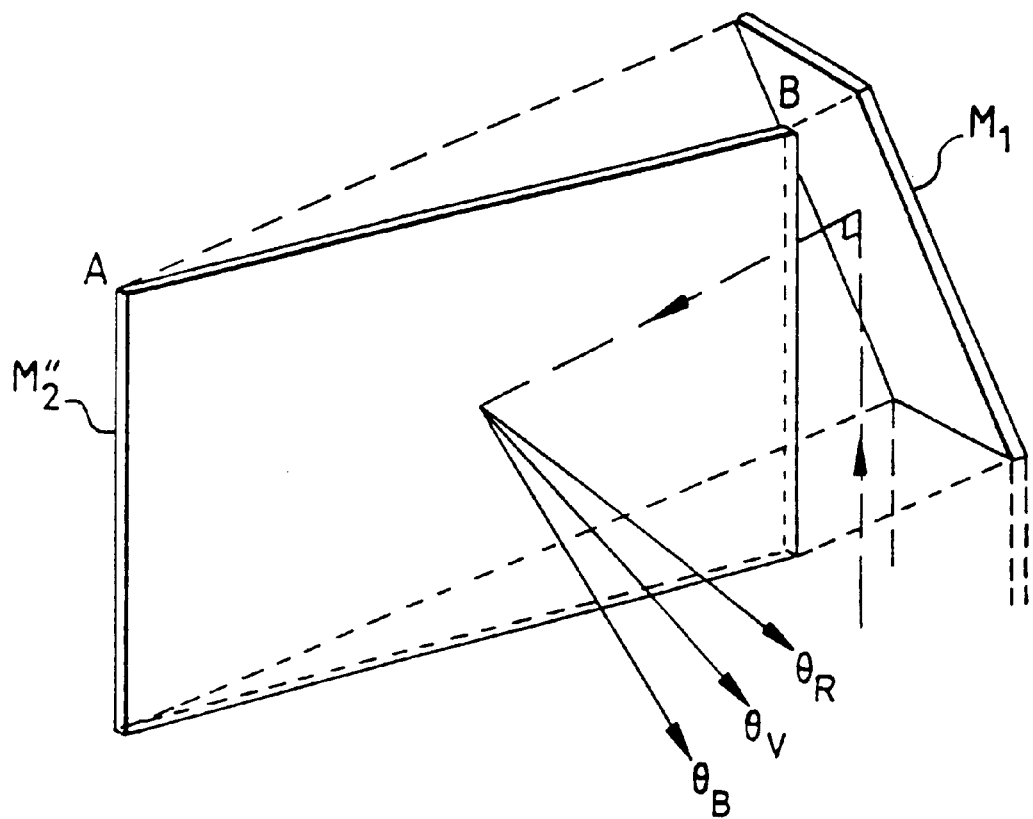
FIG. 12 illustrates a variant of the trichrome display device according to the invention, using another possible configuration for the members $M_1$ and $M_2$.

A variant of the three-colour display device making it possible to obtain high chromatic dispersion and which is more particularly beneficial for the illumination of an image of smaller size, consists in placing the active matrix along the diagonal AB represented in FIG. 12 and a high-efficiency transmission holographic grating $M''_2$ diffracts in the mean direction $\theta=0$ with respect to the normal to the plane of the active matrix. As in the three-colour display device described earlier, this array provides for the dispersion of the collimated beam of white light in angular directions $\theta_R$, $\theta_G=0$ and $\theta_B$. The beams thus generated are focused on the elementary sub-pixels $X_{Ri,j}$, $X_{Gi,j}$ and $X_{Bi,j}$ respectively. Such a configuration is especially compact insofar as the array of lenses $R_1$ is in contact with the diffractive member $M'_2$. In this case, the members $M'_2$ and $R_1$ may be combined into a single diffractive member which performs both the focusing function and the dispersion function. This type of member has been described by the Applicant in a previous patent application (publication No. 2 711 878).

The three-colour display device of the invention thus makes it possible to devise a large-size liquid crystal screen with active matrix having the following characteristics:

- a small dimension of the elementary pixels, ensuring operation at video rate, and compatible with the conventional technologies for producing transistors and control electrodes;
- a large matrix spacing (typically $p_N \sim p_M = 1$ mm) as compared with the dimensions of the elementary pixels (typically $d_N \sim d_M = 60$ μm)
- conditions of efficient illumination of the liquid crystal matrix, effected by means for anamorphic the incident beam and means of spatio-chromatic focusing in each elementary sub-pixel;
- an extremely compact structure (typically a thickness of the order of 50 mm) of large dimensions (typically greater than 800×600 mm$^2$).

The invention also proposes an original and direct process for constructing the active matrix using steps for masking directly through the lens array $R_1$. In the prior art, the elementary pixels of the active matrix had an area equivalent to the pupil of the lenses of the array $R_1$, hence it was not conceivable with ratios of close to the thickness of the substrate of the active matrix, to image large surfaces from the lenses used. According to the invention this becomes possible by virtue of markedly smaller elementary pixel areas than those of the pupils of the lenses.

Example of a monochrome display device embodiment

A liquid-crystal active matrix with elementary pixels of dimensions:

$$d_N \times d_M = 60 \ \mu m \times 60 \ \mu m$$

separated by spacings $p_N = p_M = 1$ mm the total surface area of the active matrix being 80×60 cm$^2$ a light source of the short-arc lamp type for example a metal halide lamp with an arc measuring around 1 mm and an extension t=6 mm;

two square-pupil lens arrays $R_1$ and $R_2$ with a lens spacing of 1 mm;

a short-arc lamp collimating lens of focal length f=100 mm and diameter $\phi=50$ mm;

two holographic gratings $M_1$ and $M_2$ operating in reflection mode or transmission mode, made on a photopolymer with a thickness of around 10 μm.

What is claimed is:

1. Display device comprising:

an illuminating source configured to emit radiation Is;

a spatial light modulator illuminated by the radiation Is, and comprising a matrix of N×M elementary pixels ($X_{i,j}$) of dimensions $d_N \times d_M$ divided into a plurality of groups of elementary image pixels by vertical and horizontal addressing electrodes, wherein elementary pixels $X_{i,j}$ and $X_{i+1,j}$ are separated by a spacing $p_N$ corresponding to the spacing of the vertical addressing electrodes and the pixels $X_{i,j}$ and $X_{i,j+1}$ are separated by a spacing $p_M$ corresponding to the spacing of the horizontal addressing electrodes; and means for collimating the radiation Is in each pixel such that the spacing $p_N$ is greater by at least an order of magnitude than the dimension $d_N$.

2. Display device according to claim 1, characterized in that the spacing $p_M$ is greater by at least an order of magnitude than the dimension $d_M$.

3. Display device according to claim 2, characterized in that it comprises an array ($R_1$) of lenses, between the illumination device and the spatial light modulator so as to focus the radiation Is (R, G, B) in the pixel $X_{i,j}$ ($X_{Ri,j}$; $X_{Gi,j}$; $X_{Bi,j}$).

4. Display device according to claim 2, characterized in that the pixel dimensions $d_N \times d_M$ are of the order of 100×100 μm$^2$, the spacings $P_N$ and $P_M$ being of the order of 1 mm$^2$.

5. Display device according to claim 1, characterized in that it comprises an array ($R_1$) of lenses, between the illumination device and the spatial light modulator so as to focus the radiation Is (R, G, B) in the pixel $X_{i,j}$ ($X_{Ri,j}$; $X_{Gi,j}$; $X_{bi,j}$).

6. Display device according to claim 5, characterized in that the array ($R_1$) comprises N×M spherical lenses whose pupil is of the order of magnitude of the parameter $p_N \times p_M$.

7. Display device according to claim 1, characterized in that the pixel dimensions $d_N \times d_M$ are of the order of 100×100 μm$^2$, the spacings $p_N$ and $p_M$ being of the order of 1 mm$^2$.

8. Display device according to claim 1, characterized in that the illuminating source comprises a light source and a light waveguide coupled to the said light source, the light waveguide comprising a diffracting element situated along the guide, in order to diffract emergent light rays from the source, in a direction substantially perpendicular to the surface of the waveguide, the said surface of the waveguide being substantially parallel to the plane of the spatial light modulator.

9. Display device according to claim 1, characterized in that the illuminating source comprises a light source, a light waveguide coupled to the said light source and an array of prisms, the angles at the base of the prisms being around 45° with the axis of the guide.

10. Display device comprising:

a light source configured to emit simultaneously several radiations in chromatic component ranges (R, G, B); and a spatial light modulator comprising a matrix of N×M elementary dots ($D_{i,j}$) divided into a plurality of groups of elementary image dots by vertical and horizontal addressing electrodes, wherein each dot includes at least one elementary sub-pixel per chromatic component range ($X_{Ri,j}$; $X_{Gi,j}$; $X_{Bi,j}$) of dimensions $d_N \times d_M$, the sub-pixels $X_{Ri,j}$ ($X_{Gi,j}$; $X_{Bi,j}$) are separated from the sub-pixels $X_{R(i+1),j}$ ($X_{G(i+1),j}$; $X_{B(i+1),j}$) by a spacing $p_N$ corresponding to the spacing of the vertical addressing electrodes, the pixels $X_{Ri,j}$ ($X_{Gi,j}$; $X_{Bi,j}$) are separated from the pixels $X_{Ri,j+1}$ ($X_{Gi,j+1}$; $X_{Bi,j+1}$) by a spacing $p_M$ corresponding to the spacing of the horizontal addressing electrodes, and the spacing $p_N$ is greater by at least an order of magnitude than the dimension $d_N$.

11. Display device according to claim 10, characterized in that the spacing $p_M$ is greater by at least an order of magnitude than the dimension $d_M$.

12. Display device according to claim 11, characterized in that it comprises an array ($R_1$) of lenses, between the illumination device and the spatial light modulator so as to focus the radiation Is (R, G, B) in the pixel $X_{i,j}$ ($X_{Ri,j}$; $X_{Gi,j}$; $X_{Bi,j}$).

13. Display device according to claim 11, characterized in that the pixel dimensions $d_N \times d_M$ are of the order of 100×100 $\mu$m$^2$, the spacings $P_N$ and $P_M$ being of the order of 1 mm$^2$.

14. Display device according to claim 10, characterized in that it further includes R, G, B filters.

15. Display device according to claim 10, characterized in that the illuminating source comprises spatio-chromatic means.

16. Display device according to claim 15, characterized in that the illuminating source comprises a source of light emitting a beam of light, means for collimating the said beam, an anamorphic mirror ($M_1$) whose surface makes an angle $\theta_1$ with a plane orthogonal to the plane of the active matrix, the mirror ($M_1$) having the function of spreading the beam of collimated light in a plane parallel to the plane of the active matrix, and a reflective or transparent anamorphic member ($M_2$) capable of collimating the light flux in a plane substantially perpendicular to the plane of the active matrix.

17. Display device according to claim 16, characterized in that the member ($M_2$) diffracts the red in a direction $\theta_R$, the green in a direction $\theta_G$ substantially equal to 0, the blue in a direction $\theta_B$, the said directions being defined with respect to the normal to the plane of the active matrix.

18. Display device according to claim 10, characterized in that it comprises an array ($R_1$) of lenses, between the illumination device and the spatial light modulator so as to focus the radiation Is (R, G, B) in the pixel $X_{i,j}$ ($X_{Ri,j}$; $X_{Gi,j}$; $X_{Bi,j}$).

19. Display device according to claim 10, characterized in that the pixel dimensions $d_N \times d_M$ are of the order of 100×100 $\mu$m$^2$, the spacings $P_N$ and $P_M$ being of the order of 1 mm$^2$.

20. Method for manufacturing a display device including a spatial light modulator including a matrix of N×M elementary pixels on a substrate comprising the steps of:

masking with the aid of suitable masks so as to define the N×M elementary pixels, control electrodes and switching circuits of the spatial modulator;

employing an array $R_1$ of lenses on the rear face of the substrate intended for the construction of the spatial modulator; and imaging directly the various masks through the array $R_1$ of lenses so as to produce, on the front face of the pixel, the elementary pixels, the electrodes and the control circuits.

21. Display device comprising:

an illuminating source configured to emit radiation Is;

a spatial light modulator illuminated by the radiation Is, and comprising a matrix of N×M elementary pixels ($X_{i,j}$) of dimensions $d_N \times d_M$ divided into a plurality of groups of elementary image pixels by vertical and horizontal addressing electrodes, wherein elementary pixels $X_{i,j}$ and $X_{i+1,j}$ are separated by a spacing $p_N$ corresponding to the spacing of the vertical addressing electrodes and the pixels $X_{i,j}$ and $X_{i,j+1}$ are separated by a spacing $p_M$ corresponding to the spacing of the horizontal addressing electrodes; and a collimator configured to collimate the radiation Is in each pixel such that the spacing $p_N$ is greater by at least an order of magnitude than the dimension $d_N$.

* * * * *